United States Patent Office 3,772,257
Patented Nov. 13, 1973

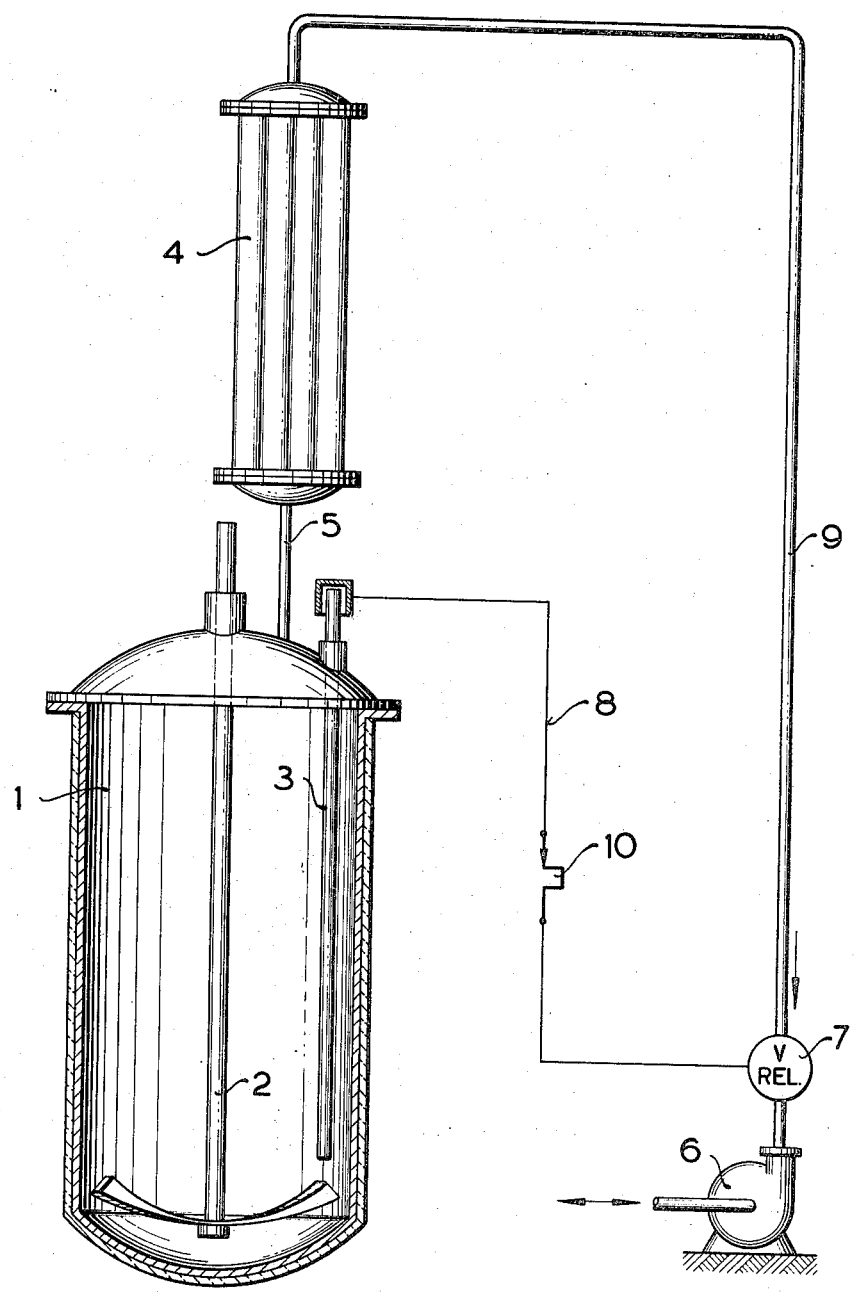

3,772,257
PRODUCTION OF STYRENE/ACRYLONITRILE-COPOLYMERS
Gerhard Kohlpoth, Bochum, Peter Komischke, Hurth-Efferen, Johann Mixich, Liblar, and Hans-Joachim Kilger, Hurth, Germany, assignors to Knapsack Aktiengesellschaft, Knapsack, near Cologne, Germany
Filed Nov. 22, 1971, Ser. No. 201,110
Claims priority, application Germany, Nov. 21, 1970, P 20 57 250.3
Int. Cl. C08f 15/22
U.S. Cl. 260—85.5 R  3 Claims

ABSTRACT OF THE DISCLOSURE

Production of styrene/acrylonitrile copolymers by polymerization in emulsion in the presence of a suitable catalyst and an emulsifier, wherein following the start-up of the polymerization, which gives rise to the evolution of considerable heat of reaction, a portion of the reaction heat is used for maintaining the necessary reaction temperature and for preheating feed material, and the balance of the reaction heat is dissipated so as to prevent the reaction temperature from exceeding a given maximum value. To this end the polymerization mixture is subjected to vapor cooling with evaporation of a fraction of the polymerization mixture, the evaporated fraction is liquefied in a condenser, and resulting condensate is refluxed to the polymerization zone.

---

The present invention relates to the production of styrene-acrylonitrile copolymers by polymerization in emulsion, wherein a fraction of the polymerization batch is introduced into a polymerization vessel, heated therein to a temperature of between about 70 and 85° C. so as to initiate and maintain the polymerization, and the balance of the polymerization batch is gradually added and polymerized.

U.S. Pat. 2,439,202 describes the production of styrene/acrylonitrile-copolymers by emulsion polymerization in the presence of a peroxide catalyst, a suitable emulsifier and a regulator. To this end, the polymerization batch, which is an aqueous emulsion, is introduced into an autoclave fitted with a stirrer and the polymerization is initiated by stirring and heating the batch to a temperature of between about 25 and 90° C. This is an exothermal polymerization reaction, wherein the heat set free is partially used to maintain the temperature necessary for polymerization, and heat in excess is dissipated, if necessary by cooling. The reaction time, which largely depends on the reaction temperature used, is between 10 and 14 hours in this earlier process. Following completion of the polymerization, the polymer is isolated by conventional coagulation.

This process is not fully satisfactory. This in view of the relatively long reaction times and the poor space/time yield. Shorter reaction times, however, call for the use of higher reaction temperatures which in turn call for the dissipation of heat. This is a rather complicated procedure as the polymerization is required to be carried out at fairly constant temperatures so as to produce high-grade copolymers, with respect to the physical properties thereof.

German published specification 1,802,089 describes a process for the polymerization in emulsion, which is useful inter alia in the production of styrene/acrylonitrile-copolymers, and wherein a fraction of the material to undergo polymerization is introduced together with water, emulsifier and catalyst into a first reactor and partially polymerized therein. Following this, the partially polymerized fraction is delivered to a second reactor and fully polymerized therein together with the balance of the polymerization batch. This earlier process is said to offer a beneficial effect in enabling full use to be made of the two reactors' cooling capacity. This in view of the fact that the heat set free during the exothermal polymerization is distributed among the two reactors by the proportionate supply of monomeric material thereto. In this process, the polymerization batch is allowed to remain in the reactors over a period of between 1 and 10 hours.

This process obviously tries to solve the problem of controlling the reaction heat by the use of two reactors receiving the polymerization batch, naturally with increased capital investment and commercially adverse effects.

As described in "Chemie-Ingenieur-Technik," 38 (1966), volume 10, page 1031, it is old in solution polymerizations to dissipate polymerization heat in excess by vapor cooling. To this end, it is necessary to establish pressure and temperature conditions in the reactor, at which the material therein is kept boiling. Monomeric material and solvent in vapor form escaping at the surface of the liquid material are evaporated and effect the abstraction of heat from the liquid phase. The escaping vaporous matter is removed from the reactor, condensed and liquefied and successively recycled to the reactor.

The principle underlying vapor cooling has not been tried heretofore in the production of styrene/acrylonitrile-copolymers by subjecting the corresponding monomers to polymerization in emulsion, despite the fact that it enables maximum cooling effects, to be produced per cubic meter of material in a reactor, and this in comparison with conventional cooling methods. On the other hand, if use is made of this cooling technique, one would expect the polymerization batch, i.e. the batch component with the lowest boiling point therein, namely acrylonitrile, to undergo partial distillation in the reflux cooler maintained under vacuum and mounted upstream of the polymerization vessel, and one would further expect the formation of a polymer unreliable in its physical properties. This in view of the fact that the distillation manifests itself in a continuous change of the quantitative ratio of monomers, in the liquid phase. This disadvantageous phenomenon does unexpectedly not occur in the process of the present invention, which yields a product useful, for example, as a blend component in the production of elastomeric acrylonitrile/butadiene-styrene-moulding compositions, for example in accordance with Belgian Pat. 729,126. The acrylonitrile/butadiene/styrene-copolymer made with the product of the present invention was even found to have an improved notched impact strength.

The process of the present invention for the manufacture of styrene/acrylonitrile copolymers by polymerization in emulsion in the presence of a suitable catalyst and an emulsifier, wherein a fraction of the polymerization batch is introduced into a polymerization zone, stirred and heated therein to a temperature of between about 70 and 85° C. so as to initiate and maintain the polymerization, and the balance of the polymerization batch is gradually added and polymerized, and wherein, following termination of the polymerization reaction, the resulting latex is made into a copolymer, comprises, following the start-up of the polymerization, which gives rise to the evolution of considerable heat of reaction, using a portion of said reaction heat for maintaining the necessary reaction temperature and for preheating feed material; and dissipating the balance of said reaction heat so as to prevent the reaction temperature from exceeding a given maximum value, the said balance portion of said reaction heat being dissipated by subjecting the polymerization mixture to vapor cooling with evaporation of a fraction of the polymerization mixture, liquefying the evaporated fraction in a condenser, and refluxing resulting condensate to the polymerization zone.

A further embodiment of the process of the present invention comprises evaporating the fraction of the polymerization mixture at the necessary reaction temperature by establishing beneficial pressure conditions in the polymerization zone. Temperature changes, which the polymerization mixture undergoes during the polymerization, are regulated by varying the pressure prevailing in the polymerization zone.

As already stated above in connection with the principle underlying vapor cooling, reflux conditions are maintained in the reaction vessel during the polymerization. In the present case, the reflux matter substantially is acrylonitrile, which is the component with the lowest boiling point, in the polymerization batch. The monomers subjected to polymerization in accordance with the present invention preferably include styrene and acrylonitrile, which should preferably be used in a quantitative ratio of between 75 and 65 parts by weight of styrene and between 25 and 35 parts by weight of acrylonitrile.

A further preferred embodiment of the present invention comprises carrying out the polymerization at a temperature of between about 70 and 85° C. Within this temperature range, the polymerization catalyst should not be volatile, as a volatile catalyst would readily give rise to undesirable polymerization of evaporating monomer, in the condenser. The useful polymerization catalysts accordingly include conventional non-volatile catalysts, such as potassium persulfate or $(NH_4)_2S_2O_8$ and similar catalysts. As the evolution of heat and the reflux of acrylonitrile decrease as the polymerization goes on, it is beneficial to reduce the pressure prevailing in the reaction zone in such a manner that the reaction mixture is kept boiling at the necessary polymerization temperature of 80° C., for example.

The polymer made by the process of the present invention is a blend component useful in the production of thermoplastic, impact resistant moulding materials. These can be produced, for example, by the three step process described in British specification 1,999,907 with the use of the acrylonitrile/styrene-copolymer of the present invention, in the third step. It has unexpectedly been discovered that ABS-moulding material, which is produced by the process reported in British specification 1,999,907 with the use of the present copolymer as the third step blend component, has a notched impact strength excelling that of moulding material blended with a conventional styrene/acrylonitrile-copolymer.

In addition to this, it is technically beneficial to use the process of the present invention as it enables large polymerization batches to be processed in appropriately dimensioned polymerization vessels. This in view of the fact that the abstraction of heat in the exothermal reaction is an uncomplicated procedure given the use of an efficient condenser. Undesirable temperature changes which may occur during the polymerization can rapidly and effectively be governed by regulating the pressure prevailing in the reactor. As a result, the polymerization can be effected at substantially constant temperatures. These optimum working conditions manifest themselves in the quality of the product of the present invention. In addition thereto, it is possible by the present process to produce good space/time-yields, and this for an average reaction period of between about 1 and 3 hours.

The process of the present invention should preferably be carried out with the use of the exemplary apparatus shown diagrammatically in the accompanying drawing.

As can be seen, the apparatus comprises a reactor 1 fitted with an exterior insulation, an agitator 2 and a contact thermometer 3. Upstream of reactor 1, there is positioned a condenser 4 which communicates with reactor 1, through a conduit 5. Vacuum pump 6 and regulating valve 7 serve to regulate the pressure prevailing in reactor 1, during the polymerization. Regulating valve 7 is connected by means of conduit 8 having a regulator 10 therein to thermometer 3, and vacuum pump 6 is connected to condenser 4, by means of conduit 9.

The apparatus described above was successfully used in carrying out the following example.

EXAMPLE

A blend (A), which was a solution of 300 kg. of Dresinate (sodium salt of abietic acid) and 6 kg. of $K_2S_2O_8$ in 14,550 kg. of desalted water, and a blend (B) which was a solution of 3,140 kg. of acrylonitrile, 6,840 kg. of styrene and 40 kg. of tertiary dodecylmercaptane, were prepared.

4,620 liters of blend (A) and 925 liters of blend (B) were introduced into an agitator vessel with a capacity of 25 cubic meters, which was scavenged with nitrogen and fitted with an exterior insulation and a condenser placed upstream thereof, and the whole was stirred. The solutions, which were preheated earlier, had a temperature of 80° C., in the vessel.

At the start of the reaction—this was indicated by a temperature increase in the vessel—the pressure prevailing in the reaction zone was so regulated by means of vacuum pump 6 and regulating valve 10 that reflux of evaporated matter commenced to occur, in condenser 4. This enabled reaction heat in excess to be dissipated and the polymerization temperature to be maintained at 80° C. The temperature prevailing inside the vessel was the pilot magnitude selected for a control circuit. At the same time, the balance of unheated starting solutions was introduced into the reactor at an hourly rate of 5,080 liters of blend (A) and 5,270 liters of blend (B).

As the reaction went on, the pressure prevailing in the reaction zone was automatically lowered by means of the control circuit, so as to keep the reaction mixture boiling at 80° C. This enabled the polymerization heat in excess to be further dissipated via condenser 4.

Following complete introduction of feed blends (A) and (B) into the reactor, the material therein was stirred for a further 1 hour so as to complete the polymerization. The resulting product was obtained at a temperature of about 80° C. This in view of the fact that polymerization heat continued to be set free and further in view of the fact that the vessel was insulated.

The copolymer so made had a reduced specific viscosity of 0.728, determined as a 0.5% solution in dimethylformamide, at 25° C.

To determine its properties, the copolymer latex so made was blended with an elastomeric latex prepared in the manner described in British specification 1,999,907 so as to obtain a final product containing 21 weight percent of the elastomeric component. The latex blend was worked up in conventional manner by precipitating and drying the copolymer, and a thermoplastic material with a notched impact strength of 20 kp. cm./cm.$^2$ was obtained.

For the purpose of comparison, a styrene/acrylonitrile-copolymer with a reduced specific viscosity value of equally 0.728 was produced by the process reported in German published specification 1,802,089, and the copolymer was blended with the elastomeric latex of British specification 1,999,907 so as to obtain a final product containing 21 weight percent of the elastomeric component. The thermoplastic comparative product isolated from the latex blend was found to have a notched impact strength of merely 13–15 kp. cm./cm.$^2$, at 0° C.

Subjecting the monomer quantities used in the present example to conventional polymerization would not produce the space/time-yield obtained in the present invention, as it is impossible in such conventional polymerization methods satisfactorily to dissipate the considerable heat of polymerization set free.

We claim:

1. In the process for making styrene-acrylonitrile copolymers containing styrene and acrylonitrile in a ratio between 65–75 parts by weight of styrene to 25–35 parts by weight of acrylonitrile by subjecting the monomers to emulsion polymerization at temperatures substantially between 70 and 85° C. in an aqueous medium containing a catalyst and an emulsifier, the monomers and the aqueous medium being used in a ratio by weight substantially of 2:3, and reaction heat set free during the polymerization being removed by subjecting the reaction mixture to vapor cooling, the improvement which comprises initially subjecting to polymerization in a reaction zone a polymerization batch comprised substantially of a 10% by weight fraction of the monomers and an adequate fraction of the said aqueous medium, the two fractions being preheated to reaction temperature; continuously adding to the said polymerization batch the balance fractions of monomers and aqueous medium; utilizing reaction heat, which is evolved during the polymerization, for heating the said balance fractions to the reaction temperature and for maintaining a continuous reflux of monomers in the reaction zone; and varying the pressure prevailing in the reaction zone so as to maintain the reaction temperature and the reflux of monomers constant.

2. The process as claimed in claim 1 wherein the condensate is substantially acrylonitrile.

3. The process as claimed in claim 1 wherein the catalyst is a non-volatile polymerization catalyst.

References Cited
UNITED STATES PATENTS

| | | | |
|---|---|---|---|
| 2,559,155 | 7/1951 | Chapin et al. | 260—85.5 R |
| 2,745,824 | 5/1956 | Melchore | 260—85.5 R |

HARRY WONG, JR., Primary Examiner

U.S. Cl. X.R.

260—29.6 R, 29.6 RB, 85.5 P, 89.3